United States Patent
Chen et al.

(10) Patent No.: US 8,145,764 B2
(45) Date of Patent: Mar. 27, 2012

(54) NETWORK SHARING METHOD WITHOUT CONFLICT

(75) Inventors: Chih-Yi Chen, Taipei (TW);
Hsien-Kang Wang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 170 days.

(21) Appl. No.: 12/467,698

(22) Filed: May 18, 2009

(65) Prior Publication Data
US 2009/0300218 A1 Dec. 3, 2009

(30) Foreign Application Priority Data
May 30, 2008 (TW) .............................. 97120243 A

(51) Int. Cl.
*G06F 15/16* (2006.01)
(52) U.S. Cl. .................. 709/226; 709/220; 709/245
(58) Field of Classification Search .................. 709/224, 709/229, 231, 220, 226, 245
See application file for complete search history.

(56) References Cited

U.S. PATENT DOCUMENTS

| | | | |
|---|---|---|---|
| 5,721,725 A * | 2/1998 | Want et al. ..................... | 370/236 |
| 6,732,165 B1 * | 5/2004 | Jennings, III .................. | 709/220 |
| 7,215,681 B2 * | 5/2007 | Li .................................. | 370/445 |
| 7,561,581 B2 * | 7/2009 | Kim et al. .................. | 370/395.54 |
| 2003/0149898 A1 * | 8/2003 | Onoda et al. .................. | 713/201 |
| 2004/0070608 A1 | 4/2004 | Saka | |
| 2005/0013280 A1 * | 1/2005 | Buddhikot et al. ........... | 370/349 |
| 2005/0207414 A1 * | 9/2005 | Duvvury ....................... | 370/389 |
| 2009/0106404 A1 * | 4/2009 | Christenson .................. | 709/222 |

FOREIGN PATENT DOCUMENTS
CN 101179603 A 5/2008
* cited by examiner

*Primary Examiner* — David Lazaro
(74) *Attorney, Agent, or Firm* — Jianq Chyun IP Office

(57) ABSTRACT

A network sharing method includes steps of generating a random waiting time, assigning a first virtual IP address to the first computer after the random waiting time has elapsed, and discriminating whether a second virtual IP address is detected. If the second virtual IP address is detected, the first virtual IP address is continuously assigned to the first computer. If the second virtual IP address is not detected, the second virtual IP address is assigned to the first computer.

5 Claims, 3 Drawing Sheets

NETWORK SHARING METHOD WITHOUT CONFLICT

FIELD OF THE INVENTION

The present invention relates to a network sharing method, and more particularly to a network sharing method by using an IP address allocation program.

BACKGROUND OF THE INVENTION

A network is a collection of computers connected to each other. The network allows computers to communicate with each other and share resources and information. For example, via a local area network (LAN), two computers communicate with each other to exchange data. Generally, these two computers are connected to the same network collection medium. FIG. 1 is a schematic functional block diagram illustrating the architecture of a typical local area network. As shown in FIG. 1, two personal computers 12 and 13 are connected to a network collection medium 10 through network cables for example. The network collection medium 10 is for example a hub or switch hub. After the personal computers 12 and 13 are connected to the network collection medium 10, the personal computers 12 and 13 are allowed to access the Internet through an Internet Service Provider (ISP) by linking a modem 11 to the Internet in a leased-line or dial-up connecting manner. As such, a local area network covering a small physical area is established. Via the local area network, the personal computers 12 and 13 communicate with each other to exchange data.

As known, even if the personal computers 12 and 13 are connected with the network collection medium 10 and the modem 11, the communication and data transfer between these two personal computers 12 and 13 has still not been enabled. In other words, after a communication protocol is installed and various network parameters are set, the connection, communication, and data transfer between these two personal computers 12 and 13 are enabled.

The common communication protocols include for example NetBEUI (NetBIOS Extended User Interface) and TCP/IP (Transmission Control Protocol/Internet Protocol). These two communication protocols make these two computers communicate within the local area network. Moreover, the network parameters to be set include for example the IP (Internet Protocol) address of the personal computer, the subnet mask parameter, the DNS (Domain Name System) server address, the gateway address, the workgroup name, and so on. After the network parameters are set, the local area network covering these two personal computers is established.

FIG. 2 is a schematic flowchart illustrating a process of establishing a local area network. First of all, communication protocols (e.g. NetBEUI and TCP/IP) are installed (Step 21). Next, the IP address of the personal computer is set (Step 22). The IP address is a logical address that is assigned to the computer participating in the network. Since all computers connecting to the network have unique logical addresses, the computers participating in the network are distinguished and identified according to the IP addresses so as to avoid erroneous data transmission. Next, the subnet mask parameter is set (Step 23). The user may discriminate the source and destination of the data according to the subnet mask. Next, the DNS server address and the gateway address are sequentially set (Steps 24 and 25). Next, the workgroup name and the computer name are sequentially set (Steps 26 and 27). After the above settings are completed, the computer is re-started (Step 28), so that the computers on the local area network may share common resources.

From the above discussion, the method of establishing the local area network to allow two computers to communicate with each other and share resources needs complicated and trivial steps. As the number of personal computers to be connected to the same network is increased, the complicated and trivial steps should be successively implemented for each personal computer. The complicated setting steps become hindrance from sharing resources for the users that are not well-educated.

For solving the above drawbacks, a dynamic host configuration protocol (DHCP) is proposed for enabling the connection, communication, and data transfer on the local area network. FIG. 3 is a schematic functional block diagram illustrating the architecture of a local area network using the DHCP. As shown in FIG. 3, two personal computers 34 and 35 are connected to a network collection medium 31 through network cables for example. After the personal computers 34 and 35 are connected to the network collection medium 31, the personal computers 34 and 35 are allowed to access the Internet through a DHCP server 32 by linking a modem 33 to the Internet. By the DHCP server 32, associated network parameters are allocated to the personal computers 34 and 35. That is, the network parameters are automatically set when the personal computers 34 and 35 are started. Likewise, the network parameters include for example the IP address of the personal computer, the subnet mask parameter, the DNS server address, the gateway address, the workgroup name, and so on. According to the architecture of the local area network shown in FIG. 3, the user only needs to set the network parameters in the DHCP server 32. By the DHCP server 32, the network parameters are automatically allocated to the personal computers that are connected to the DHCP server 32. After the network parameters are set, the local area network covering these personal computers is established. The architecture of the local area network shown in FIG. 3, however, still has some drawbacks. For example, the user needs to be familiar to the basic network knowledge. For the users not well familiar to the basic network knowledge, the architecture of the local area network shown in FIG. 3 become hindrance from setting network parameters via the DHCP server. In addition, the use of the DHCP server is not cost-effective for home-use purpose.

SUMMARY OF THE INVENTION

The present invention provides a network sharing method for sharing the common resources between two personal computers without causing IP address conflict.

The present invention provides a simplified network sharing method, which is easily implemented by the user having basic network knowledge.

In accordance with an aspect, the present invention provides a network sharing method for use in a first computer. The network sharing method includes steps of generating a random waiting time, assigning a first virtual IP address to the first computer after the random waiting time has elapsed, and discriminating whether a second virtual IP address is detected. If the second virtual IP address is detected, the first virtual IP address is continuously assigned to the first computer. Whereas, if the second virtual IP address is not detected, the second virtual IP address is assigned to the first computer.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention relates to a network sharing method. The network sharing method is used to share common resources between two or more personal computers. For implementing the network sharing method of the present invention, two or more personal computers are connected with each other or connected to the same network via the same network medium. An example of the network medium includes but is not limited to a network cable or a wireless network card.

Figure 1:
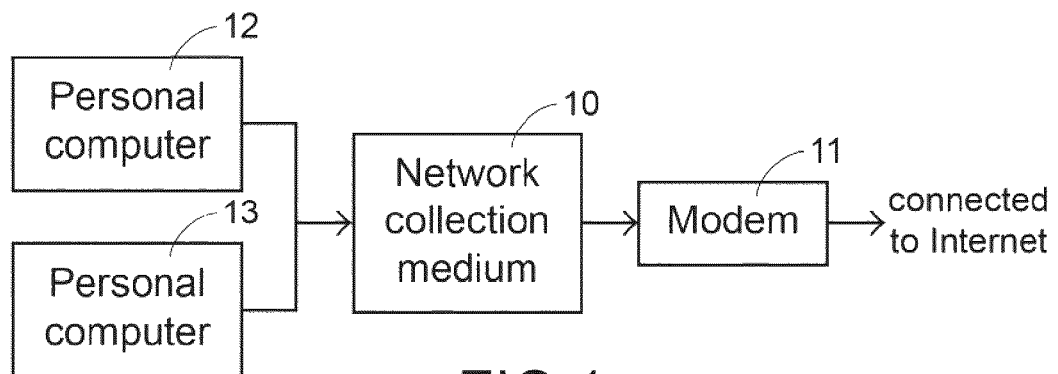
FIG. 1 is a schematic functional block diagram illustrating the architecture of a typical local area network.
Figure 2:
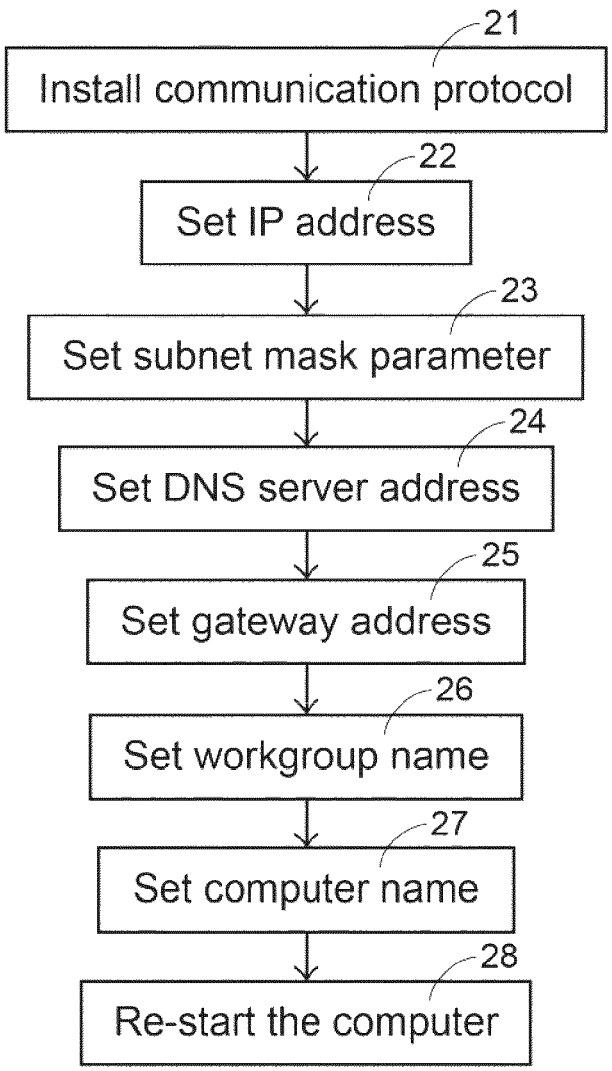
FIG. 2 is a schematic flowchart illustrating a process of establishing a local area network.
Figure 3:
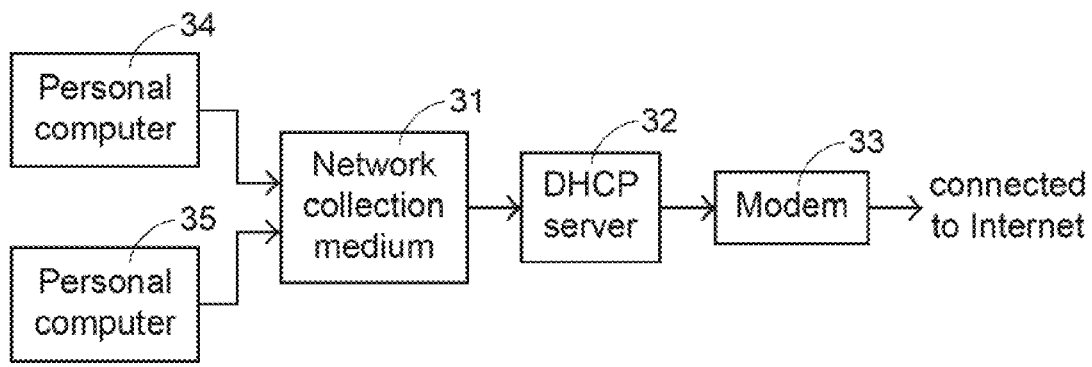
FIG. 3 is a schematic functional block diagram illustrating the architecture of a local area network using the DHCP.
Figure 4A:
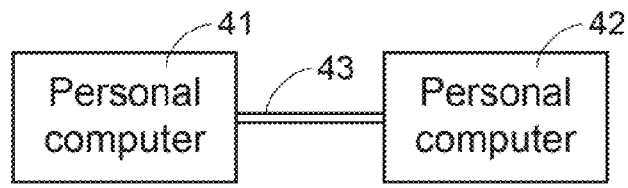
FIG. 4A is a schematic functional block diagram illustrating the connection between two personal computers for sharing the common resources via a network cable according to an embodiment of the present invention.

In a case that the network medium is a network cable, two personal computers may be connected to a network collection medium (e.g. a hub or a switch) through the network cable and then linked to the Internet through a modem (as shown in FIG. 1). In addition, via the network cable, two personal computers communicate with each other to share the common resources. FIG. 4A is a schematic functional block diagram illustrating the connection between two personal computers for sharing the common resources via a network cable according to an embodiment of the present invention. As shown in FIG. 4A, the personal computers 41 and 42 communicate with each other via the network cable 43.

Figure 4B:
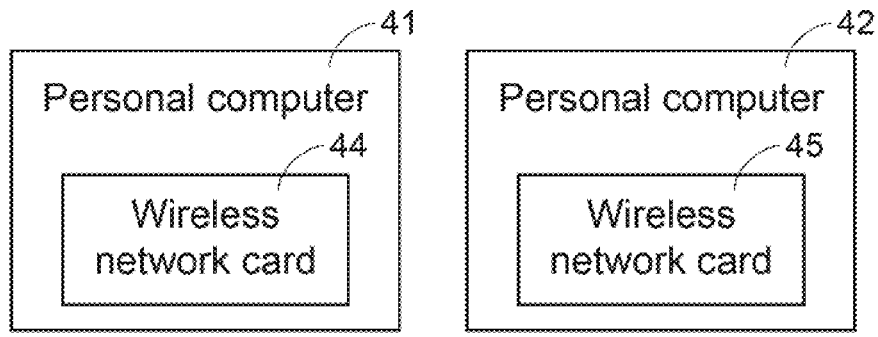
FIG. 4B is a schematic functional block diagram illustrating the connection between two personal computers for sharing the common resources via wireless network cards according to another embodiment of the present invention.

In a case that the network medium is a wireless network card, two personal computers having respective wireless network cards may communicate with each other via the wireless network cards. FIG. 4B is a schematic functional block diagram illustrating the connection between two personal computers for sharing the common resources via wireless network cards according to another embodiment of the present invention. As shown in FIG. 4B, the personal computers 41 and 42 have respective built-in wireless network cards 44 and 45. Via the wireless network cards 44 and 45, these two personal computers 41 and 42 communicate with each other or these two personal computers 41 and 42 are connected to the same wireless network.

In accordance with a key feature of the present invention, after these two personal computers 41 and 42 communicate with each other, an IP address allocation program is executed to replace the complicated and trivial setting method of the prior art. In addition, the use of the IP address allocation program can automatically assign suitable virtual IP addresses to corresponding personal computers without the need of complicated and trivial setting steps. Since the virtual IP addresses of the two personal computers are mutually searched, the possibility of causing IP address conflict is minimized. If a virtual IP address other than the virtual IP address of a personal computer is detected, the network sharing settings are completed. Whereas, if no virtual IP address other than the virtual IP address of a personal computer is detected or a virtual IP address identical to the virtual IP address of the personal computer is detected, the virtual IP address of the personal computer is automatically changed.

Figure 5:
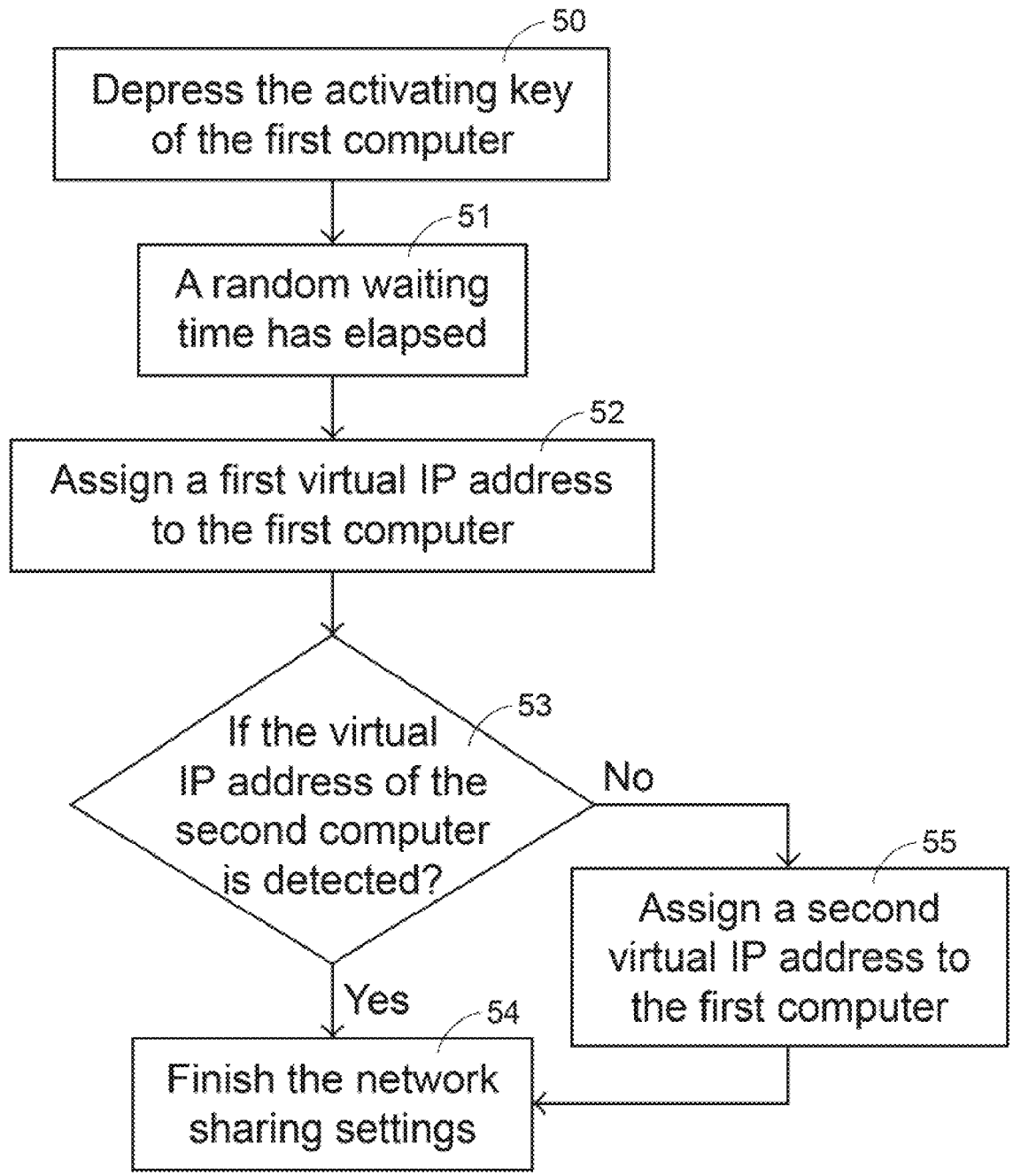
FIG. 5 is a schematic flowchart illustrating a network sharing method by using an IP address allocation program according to the present invention.

FIG. 5 is a schematic flowchart illustrating a network sharing method by using an IP address allocation program according to the present invention. Since the IP address allocation program is applied to two personal computers, the IP address allocation program may predetermine a first virtual IP address and a second virtual IP address. After the two personal computers communicate with each other via the same network medium, the activating keys of these two personal computers are depressed (Step 50). After the activating keys of these two personal computers are depressed, the IP address allocation program is activated and a random waiting time is generated (Step 51). After the random waiting time has elapsed, the first virtual IP address is assigned to the first personal computer by the IP address allocation program (Step 52). Next, the first computer searches and detects the virtual IP address of the second computer (Step 53). If the virtual IP address of the second computer is detected, the network sharing settings of the first and second computers are finished (Step 54). Meanwhile, the first computer and the second computer communicate with each other to share the common resources and perform data transmission. On the other hand, if the virtual IP address of the second computer is not detected in the Step 53, it is meant than the second computer has not yet been connected to the network, the IP address allocation program has not been activated or the first virtual IP address is also previously assigned to the second computer. Under this circumstance, the second virtual IP address is assigned to the first computer (Step 55) and thus the network sharing settings of the first and second computers are finished (Step 54).

Hereinafter, a process of implementing network sharing settings of two personal computers is illustrated. In this implementing example, it is assumed that the random waiting time of the first personal computer is 1 second and the random waiting time of the second personal computer is 2 seconds. After 1 second, a first virtual IP address is assigned to the first personal computer and the first personal computer begins to search and detect the second computer. It is assumed that the virtual IP address of the second personal computer is detected by the first personal computer after the time spot t=2 second. In other words, at t=2 second, the second personal computer is still in the waiting state and thus fails to be detected by the first personal computer. Under this circumstance, the virtual IP address of the first personal computer is changed. In the Step 55, the second virtual IP address is assigned to the first personal computer at the time spot t=3 second for example and thus the network sharing settings of the first and second personal computers are finished (Step 54). On the other hand, after the activating key of the second personal computer has been depressed for 2 seconds, a first virtual IP address is assigned to the second personal computer. At the time spot t=3 second, the second personal computer begins to search and detect the first personal computer. Since the second virtual IP address is assigned to the first personal computer at this moment, the virtual IP address of the first personal computer is successfully detected by the second personal computer. Afterwards, the network sharing settings of the first and second computers are finished (Step 54).

In the above embodiments, the random waiting time of the first personal computer and the random waiting time of the second personal computer are different. Since the virtual IP addresses of the two personal computers are mutually searched, the possibility of causing IP address conflict is minimized. Moreover, the use of the IP address allocation program can automatically assign suitable virtual IP addresses to corresponding personal computers without the need of complicated and trivial setting steps. Even the users not familiar to the basic network knowledge are capable of the connection, communication, and data transfer on the local area network by using the network sharing method of the present invention.

From the above description, the network sharing method of the present invention executes an IP address allocation program to replace the complicated and trivial setting method of the prior art. As a consequence, the network sharing method of the present invention is very user-friendly. Moreover, since the DHCP sever is no longer necessary, the network sharing method of the present invention is more cost-effective.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A network sharing method for sharing network between a first computer and a second computer, the network sharing method comprising steps of:
   generating a random waiting time in the first computer;
   assigning a first virtual IP address to the first computer after the random waiting time has elapsed in the first computer; and
   discriminating whether a second virtual IP address from a second computer is detected by the first computer, wherein if the second virtual IP address from the second computer is detected by the first computer, the first virtual IP address is continuously assigned to the first computer by the first computer, and if the second virtual IP address is not detected by the first computer, the second virtual IP address is assigned to the first computer,
   wherein the second virtual IP address remain with a second computer if the second virtual IP address in the second computer is detected by the first computer.

2. The network sharing method according to claim 1 wherein the first computer and the second computer are connected to a network medium.

3. The network sharing method according to claim 2 wherein the network medium is a wireless cable or a wireless network card.

4. The network sharing method according to claim 1 wherein an activating key of the first computer is depressed before the random waiting time is generated.

5. The network sharing method according to claim 1 wherein the first virtual IP address and the second virtual IP address are different.

* * * * *